United States Patent
Lee et al.

(10) Patent No.: US 12,426,009 B2
(45) Date of Patent: *Sep. 23, 2025

(54) UE PAGING IN NR UNLICENSED SPECTRUM

(71) Applicant: Apple Inc., Cupertino, CA (US)

(72) Inventors: Anthony Lee, San Diego, CA (US); Seau S. Lim, Swindon (GB); Yongjun Kwak, Portland, OR (US); Dae Won Lee, Portland, OR (US); Youn Hyoung Heo, Seoul (KR); Lopamudra Kundu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,751

(22) Filed: Sep. 22, 2023

(65) Prior Publication Data

US 2024/0015698 A1 Jan. 11, 2024

Related U.S. Application Data

(62) Division of application No. 17/275,531, filed as application No. PCT/US2019/052981 on Sep. 25, 2019, now Pat. No. 12,245,190.

(Continued)

(51) Int. Cl.
*H04W 68/02* (2009.01)
*H04W 72/04* (2023.01)

(52) U.S. Cl.
CPC .......... *H04W 68/02* (2013.01); *H04W 72/04* (2013.01)

(58) Field of Classification Search
CPC ..... H04W 52/02; H04W 72/04; H04W 72/12; H04W 76/04
See application file for complete search history.

(56) References Cited

U.S. PATENT DOCUMENTS 11,690,043 B2 * 6/2023 Wong ............... H04W 52/0229
370/329
2016/0057738 A1 2/2016 Lee et al.
(Continued)

FOREIGN PATENT DOCUMENTS

| CN | 107258105 | 10/2017 |
| CN | 108353381 | 7/2018 |
| WO | 2017192018 A1 | 11/2017 |

OTHER PUBLICATIONS

Notice of Grant for CN Patent Application No. 201980060270.2; Mar. 1, 2024.

(Continued)

*Primary Examiner* — Khawar Iqbal
(74) *Attorney, Agent, or Firm* — Kowert, Hood, Munyon, Rankin & Goetzel, P.C.

(57) ABSTRACT

Systems and methods of increasing paging opportunities when the unlicensed band is used are described. The gNB sends an RRC message that indicates multiple monitoring occasions in a paging occasion of a paging frame. The UE monitors a monitoring occasion of a PO to determine whether a PDCCH with a P-RNTI has been received in an unlicensed band. If such a PDCCH is received, the UE decodes PD SCH information in the PDCCH to determine whether the P-RNTI is a P-RNTI of the UE. If so, the UE avoids monitoring subsequent monitoring occasions of the PO. If the PDCCH does not contain a P-RNTI, the UE continues to monitor other monitoring occasions within the PO.

20 Claims, 8 Drawing Sheets

Related U.S. Application Data

(60) Provisional application No. 62/737,655, filed on Sep. 27, 2018.

(56) References Cited

U.S. PATENT DOCUMENTS

| | | | |
|---|---|---|---|
| 2017/0339641 A1 | 11/2017 | Nigam et al. | |
| 2018/0026698 A1 | 1/2018 | Lee | |
| 2018/0077688 A1 | 3/2018 | Yi et al. | |
| 2020/0107373 A1* | 4/2020 | Roy | H04W 4/00 |
| 2021/0185652 A1* | 6/2021 | Rune | H04W 72/0446 |
| 2021/0204244 A1* | 7/2021 | Rune | H04L 5/1469 |
| 2022/0039061 A1* | 2/2022 | Murray | H04W 56/001 |
| 2022/0046540 A1* | 2/2022 | Kwon | H04W 16/28 |
| 2022/0210866 A1* | 6/2022 | He | H04L 5/0048 |
| 2022/0394672 A1* | 12/2022 | Lee | H04W 68/025 |
| 2023/0033126 A1* | 2/2023 | Agiwal | H04B 17/318 |
| 2023/0071547 A1* | 3/2023 | Tsai | H04W 74/006 |
| 2023/0209470 A1* | 6/2023 | Lin | H04W 52/0235 455/572 |
| 2024/0015698 A1* | 1/2024 | Lee | H04W 68/02 |
| 2024/0251383 A1* | 7/2024 | Murray | H04W 56/001 |

OTHER PUBLICATIONS

Intel Corporation "Paging and Broadcast Information Handling in NR SA for RRC Connected state UE"; 3GPP TSG-RAN WG2 Meeting #101 R2-1802979; Feb. 26, 2018.

"Evolved Universal Terrestrial Radio Access (E-UTRA); User Equipment (UE) Procedures in Idle Mode", Release 15, 3GPP TS 36.304, V15.0.0, 2018, 52 pgs.

International Search Report and Written Opinion for International Application No. PCT/US2019/052981, mailed Jan. 15, 2020, 9 pgs.

* cited by examiner

UE PAGING IN NR UNLICENSED SPECTRUM

This application is a divisional application of U.S. patent application Ser. No. 17/275,531, filed Mar. 11, 2021, which is a U.S. National Stage filing of International Application No. PCT/US2019/052981, filed Sep. 25, 2019, which claims the benefit of and priority to the U.S. Provisional Application No. 62/737,655, filed Sep. 27, 2018. All of the aforementioned applications are incorporated herein by reference in their entireties.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to paging in 5G systems, and more specifically paging when the unlicensed band is used.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. An increasing number of these solutions involve the issue of the massive increase in number of UEs in use. In particular, a number of developments have focused on the use of the unlicensed spectrum to provide additional communication channels with which the eNBs/gNBs and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
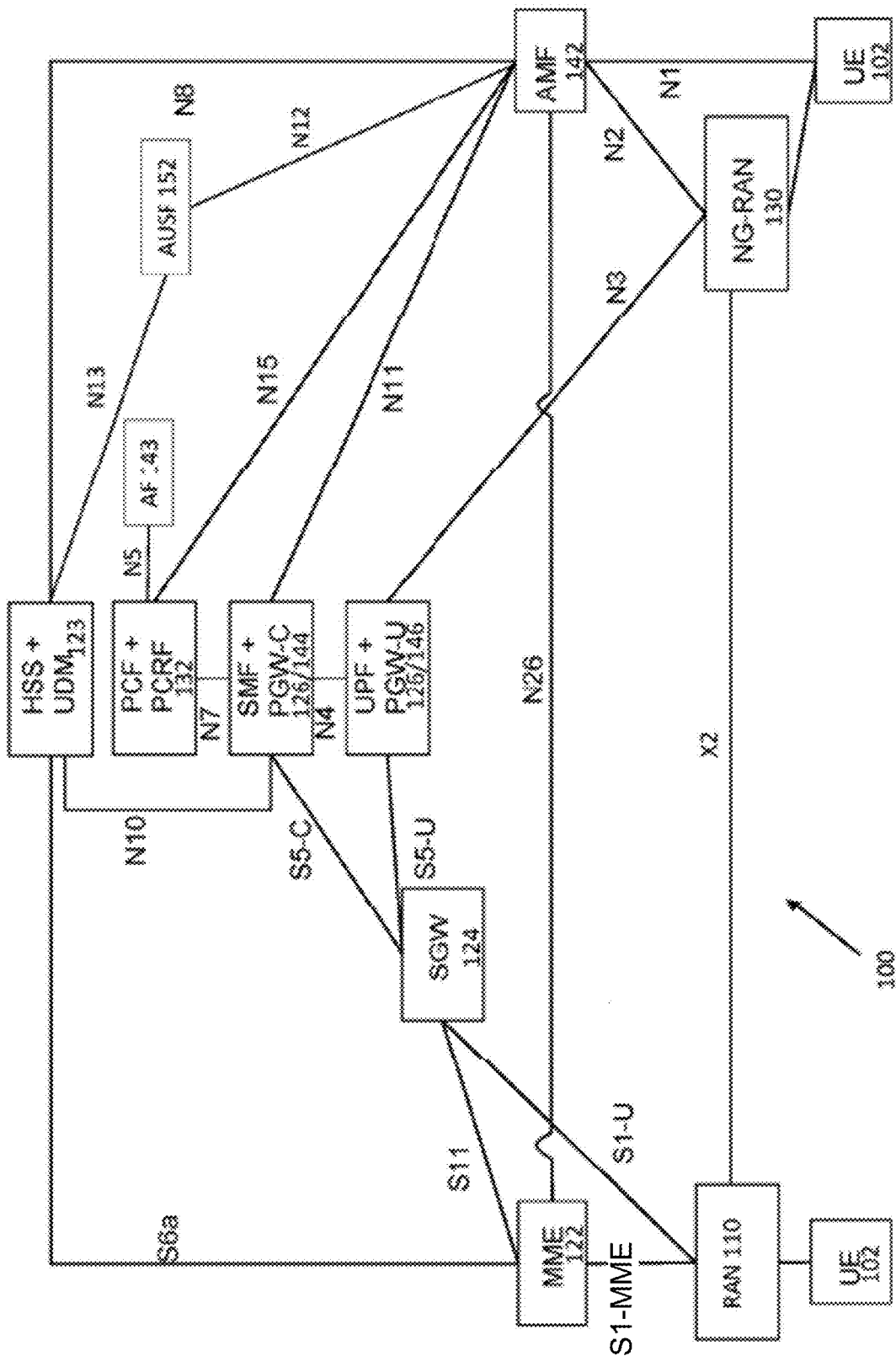
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMTs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an Sha interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
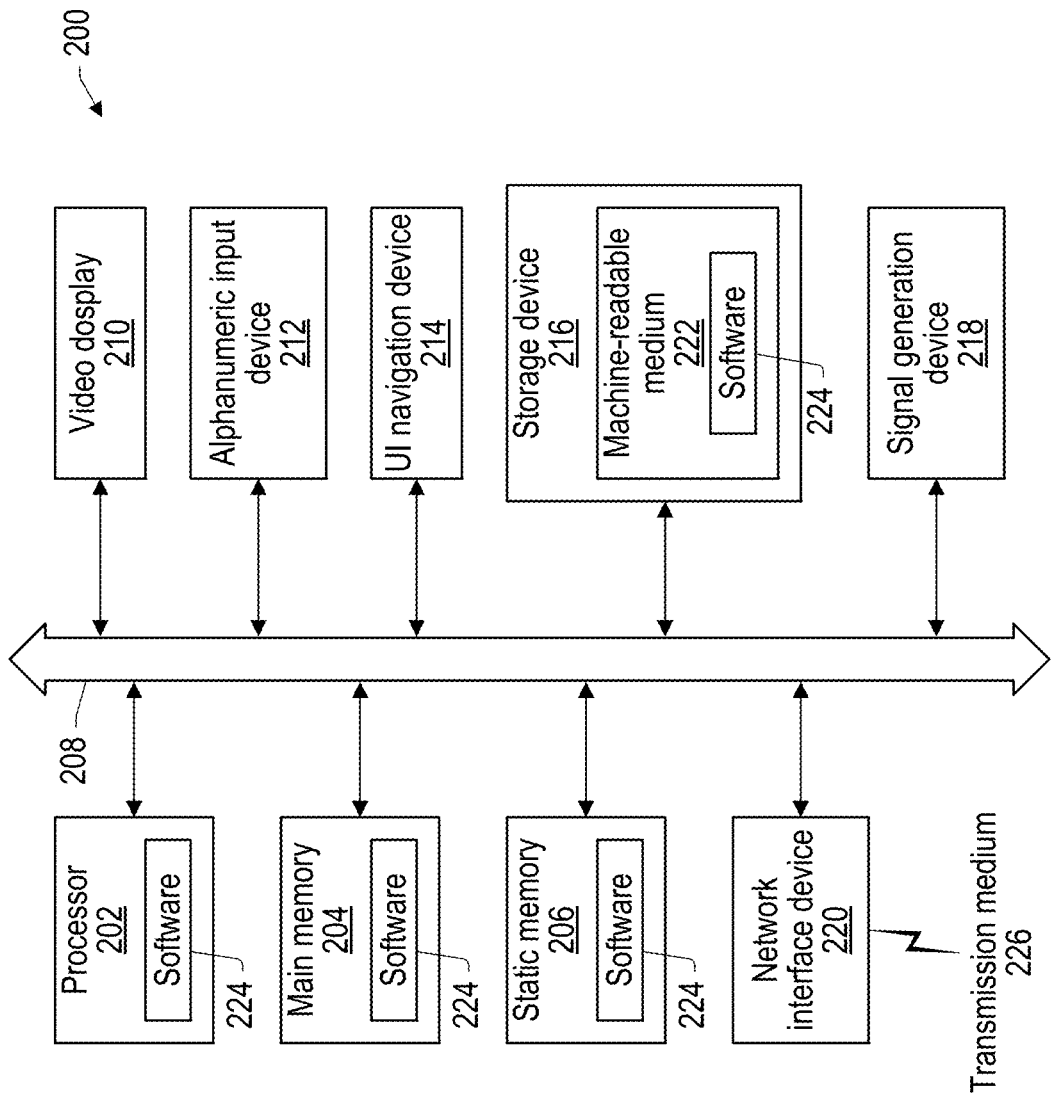
FIG. 2 illustrates a block diagram of a communication device in accordance with some embodiments.

FIG. 2 illustrates a block diagram of a communication device in accordance with some embodiments. In some embodiments, the communication device may be a LIE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse) In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, UEs may typically operate in licensed spectrum. However, the paucity of licensed spectrum in LTE and NR frequency bands may result in insufficient bandwidth to supply all UEs in a network for communication, leading, among other things, to a reduction in data throughput and a reduction in communication quality. To increase further the system throughput, NR and LTE systems may operate in the unlicensed spectrum. Potential NR and LTE operation in unlicensed spectrum includes, but is not limited to, Carrier Aggregation (CA) based on Licensed Assisted Access (LAA)/enhanced LAA (eLAA) systems, NR and LTE operation in the unlicensed spectrum via dual connectivity (DC), and standalone NR (in which the NR networks may or may not be supported by a 4G structure) and LTE systems in the unlicensed spectrum.

When using the unlicensed bands, communication devices such as base stations (eNBs/gNBs) and UEs may determine channel availability via energy detection before transmitting data on the channel. For example, the communication device may determine that the channel is occupied through a predetermined amount of energy being present in the channel or via a change in a received signal strength indication (RSSI). The communication device may detect the presence of a specific sequence, such as a preamble transmitted prior to a data transmission, that indicates use of the channel. The unlicensed channel may be reserved using a reservation signal to prevent WiFi signals from initiating transmission until the next frame boundary event. Thus, communication devices may contend for access to the unlicensed frequency band by performing clear channel assessment (CCA) procedures, and subsequently transmitting during transmission opportunities (TxOPs).

One of the functionalities of 3GPP systems is paging of a UE when there is downlink (DL) data to transmit to the UE. To determine whether there is DL data to be received, the UE may wake up, if in an idle mode of a discontinuous reception (DRX) cycle, and monitor paging occasions (POs) based on calculated times. Specifically, the UE may typically monitor one PO per DRX cycle. A PO is a set of physical downlink control channel (PDCCH) monitoring occasions and can include multiple time slots (e.g., subframes or OFDM symbols) where paging downlink control information (DCI) can be sent. One Paging Frame (PF) is one Radio Frame and may contain one or more POs, or a starting point of a PO. The PF may be determined by the following formula:

$$(\text{SFN} + \text{PF\_offset}) \bmod T = (T \text{ div } N) * (\text{UE\_ID} \bmod N)$$

where SFN is the system frame number, PF_offset is the offset of the paging frame, T is the DRX cycle of the UE, UE_ID is the international mobile subscriber identity (IMSI) of the UE mod 1024. The PDCCH monitoring occasions for paging may be determined according to whether paging-SearchSpace and firstPDCCH-MonnoringOccasionOfPO are configured. When SearchSpaceId=0 is configured for pagingSearchSpace, the PDCCH monitoring occasions for paging are same as for the remaining minimum system information (RMSI). When SearchSPaceId=0 is configured for paging-SearchSpace, Ns is either 1 or 2. For Ns=1, there is only one PO which starts in the PF. For Ns=2, the PO may be either in the first half frame (i_s=0) or the second half frame (i_s=1) of the PF.

When a SearchSpaceId other than 0 is configured for pagingSearchSpace, the UE may monitor the $(i\_s+1)^{th}$ PO. A PO is a set of 'S' consecutive PDCCH monitoring occasions, where 'S' is the number of actual transmitted SSBs determined according to ssb-PositionsInBurst in system information block 1 (SIB1). SIB1 may also provide the paging cycle information. The $K^{th}$ PDCCH monitoring occasion for paging in the PO corresponds to the $K^{th}$ transmitted SSB. The PDCCH monitoring occasions for paging that do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionofPO is present, the starting PDCCH monitoring occasion number of $(i\_s+1)^{th}$ PO is the $(i\_s+1)^{th}$ value of the firstPDCCH-MonitoringOccasionofPO parameter; otherwise, it is equal to i_s*S. Note that i_s is determined as follows:

$$i\_s = \text{floor}(\text{UE\_ID}/N) \bmod Ns$$

Figure 3:
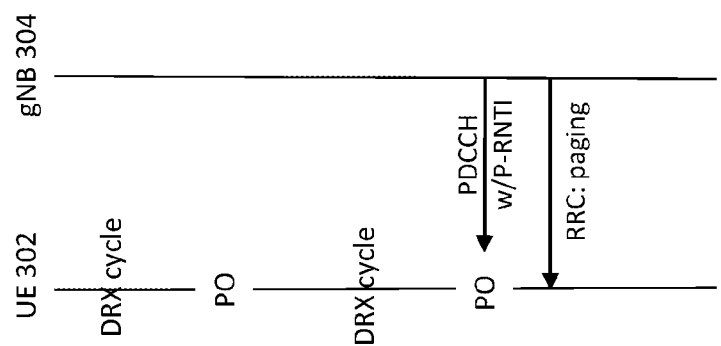
FIG. 3 illustrates an example of paging in accordance with some embodiments.

FIG. 3 illustrates an example of paging in accordance with some embodiments. The UE 302 may be in the discontinuous reception (DRX) cycle in which the UE 302 is in Idle mode. The UE 302 may wake up every paging occasion and search in monitoring occasions for a Paging Radio Network Temporary Identifier (P-RNTI) within a Signaling System Block (SSB)/PDCCH transmission transmitted by the gNB 304.

If the UE 302 determines that a PDCCH with a P-RNTI has been received in the monitoring occasion, the UE 302 may decode physical downlink shared channel (PDSCH) information present in PDCCH. In particular, the UE 302 may decode an RRC:Paging message from the PDSCH Resource Block within which the paging message is sent. The UE 302 may determine whether the P-RNTI is that of the UE 302. If not, the UE 302 may return to the idle mode to wait for the next PO in the DRX cycle. If so, the UE 302 may engage in a random access procedure.

Use of the unlicensed band, however, may complicate the paging mechanism. When the NR system operates in unlicensed band (NR-U), independent of whether the NR-U node is in standalone mode or the primary cell (Pcell) is a NR-U gNB, the paging transmission (as other transmissions in the unlicensed band) may apply a contention-based channel access mechanism such as listen-before-talk (LBT). Thus, even though a PO may be configured, and the paging transmission scheduled, the paging transmission by the gNB may still be subject to the success of LBT. Hence, depending on whether or not LBT was successful, the UE may or may not receive the paging from the network. When LBT fails for a PDCCH monitoring occasion in a PO, the paging transmission may be postponed, typically until the next PO. This, however, may not be acceptable from the mobile terminating call latency point of view and thus may be problematic for a standalone system in which the PCell operates on the unlicensed spectrum.

To mitigate this issue, one or more of several embodiments may be used. In some embodiments, the periodicity of the DRX mode used by the UE can be shortened. This may permit more transmission opportunities in which the paging message may be transmitted. However, increasing the DRX mode periodicity may come at the expense of increased UE power consumption as the UE may wake up more frequently from the idle mode. Alternatively, or in addition, the number of SSB/PDCCH monitoring occasions in a PO or the paging opportunities may be increased within a DRX cycle.

There are several ways in which the paging opportunities may be increased within a DRX cycle. For non-multibeam deployment, the number of PDCCH monitoring occasions for paging can be increased by allowing the network to schedule the PDCCH monitoring occasions for paging for x subframes. In this case, x may be configurable through higher layer signaling, such as RRC signaling. The monitoring occasions for the UE may occur at or before or after the calculated PO of the UE.

Figure 4:
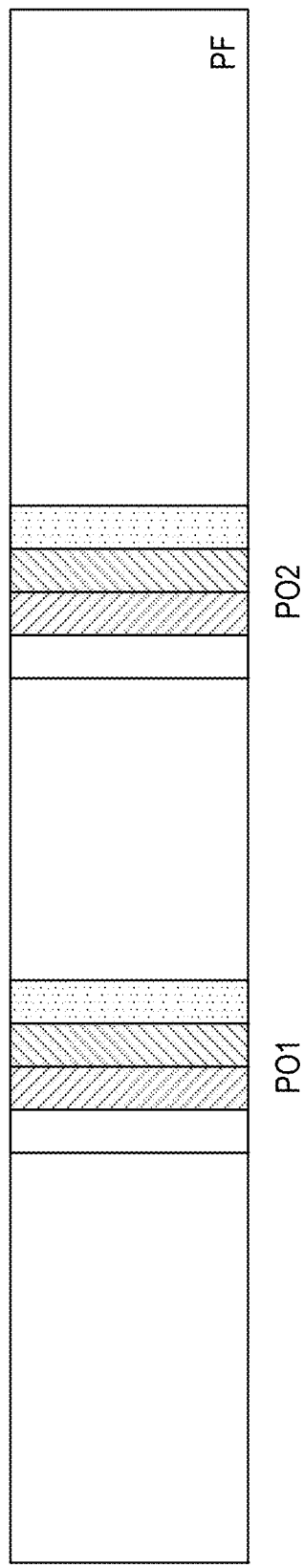
FIG. 4 illustrates an example of paging in non-multibeam deployment in accordance with some embodiments.

FIG. 4 illustrates an example of paging in non-multibeam deployment in accordance with some embodiments. Similar to FIG. 3, the UE may be in the DRX cycle and wake up every PO. The UE may search in one or more monitoring occasions of the PO for a P-RNTI within the SSB/PDCCH transmission transmitted by the gNB. If the UE determines that a PDCCH with a P-RNTI has been received in the monitoring occasion, the UE may decode an RRC:Paging message from the PDSCH Resource Block within which the paging message is sent and may determine whether the P-RNTI is that of the UE. If not, the UE may return to monitor other monitoring occasions within the PO. If so, the UE may engage in the random access procedure. The UE may thus determine whether the PDCCH is addressed to the P-RNTI in a monitoring occasion for paging corresponding to an SSB/PDCCH in a PO and if so the UE may determine that DL data is to be transmitted by the gNB and may then avoid monitoring subsequent monitoring occasions corresponding to that SSB in that PO.

As shown in FIG. 4, the paging frame (PF) may contain two POs. In particular, as shown the first PO (PO1) may be for a first set of UEs and the second PO (PO2) may be for a second set of UEs. The DCI may be repeated over the same PDCCH multiple times during each PO. As shown in FIG. 4, the DCI may be repeated four times in each PO.

Figure 5:
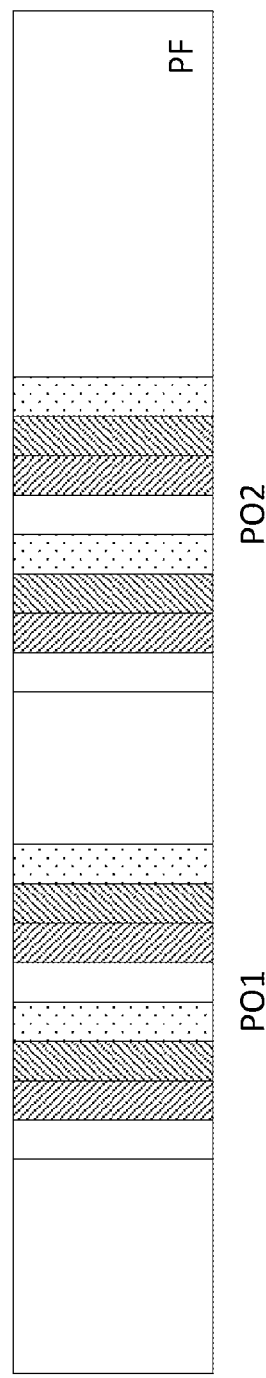
FIG. 5 illustrates an example of paging in multibeam deployment in accordance with some embodiments.

FIG. 5 illustrates an example of paging in multibeam deployment in accordance with some embodiments. For multibeam deployment, similar principals as that for FIG. 4 may be applied. That is, the number of PDCCH monitoring occasions can be increased by allowing the network to schedule the PDCCH monitoring occasions for paging for x beam sweeps (each sweep being transmitted by the gNB in a different direction). The beam sweeping may thus repeat on a different PO in a different PF. As above, x may be configurable through higher layer signaling, such as RRC signaling. As shown in FIG. 4, the paging frame may contain two POs. In particular, the first PO (PO1) may be for a first set of UEs and the second PO (PO2) may be for a second set of UEs. The beam sweeps may be repeated twice in each PO. Each SSB/PDCCH occasion may be sent twice in each PO.

Figure 6:
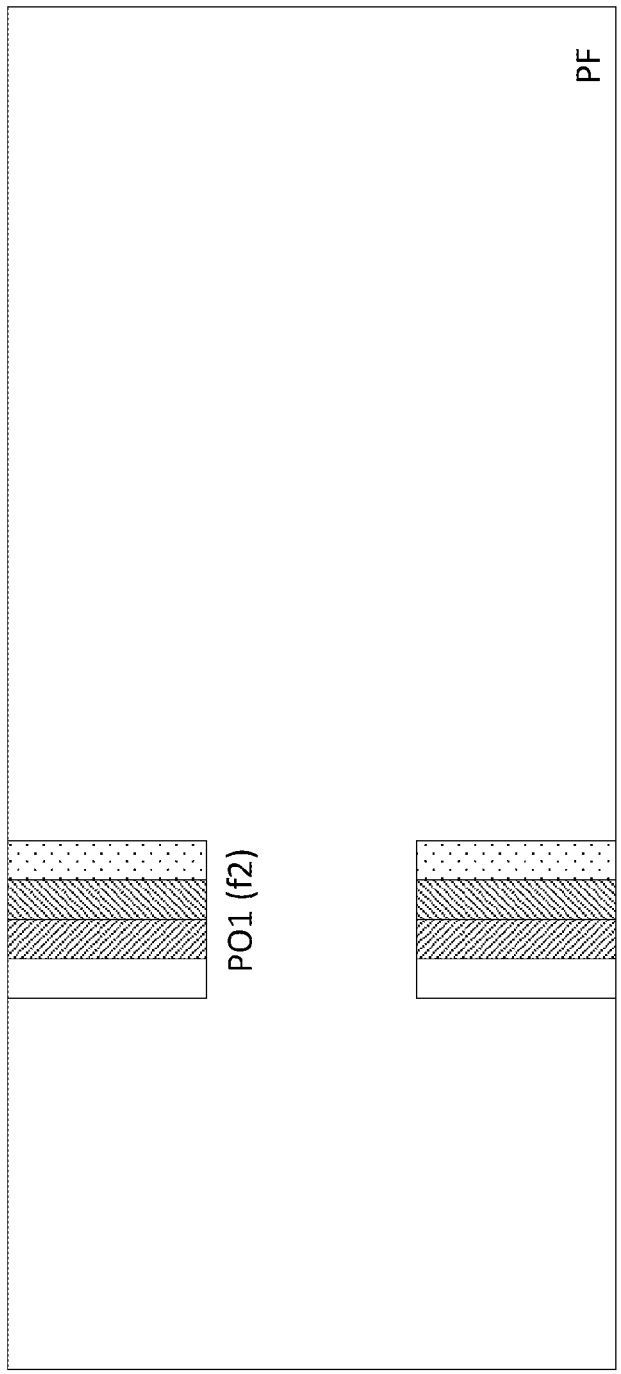
FIG. 6 illustrates an example of paging in accordance with some embodiments.

Increasing the paging transmission opportunities by repeating the POs in the time domain may avoid RF switching. However, the cost of this may be to reduce the paging capacity. Alternatively, or in addition, to increase paging opportunity the paging message may be repeated in the frequency domain. FIG. 6 illustrates an example of paging in accordance with some embodiments. Similar to FIG. 5, FIG. 6 may show paging in a multibeam system. As shown in FIG. 6, two POs are separated in frequency (f1 and f2) but overlap in the time domain. In general, each PO may overlap in the time domain. Unlike the above embodiments however, the paging formula may be changed due to the PDCCH monitoring occasions occurring simultaneously at different frequencies. In other embodiments however, one or more of the POs may not overlap in the time domain.

As above, in at least some of the above embodiments, if the UE receives a PDCCH addressed to the P-RNTI of the UE in a monitoring occasion for paging corresponding to an SSB in a PO, the UE may ignore subsequent PDCCH monitoring occasions corresponding to that SSB in that PO. The UE may also take into consideration whether the network has acquired the channel. With increase of PDCCH monitoring occasions, even though increased paging transmission opportunities are provided for the gNB, the UE may consume increased power, especially if there is no paging transmission for the UE. In order to reduce UE power consumption with the paging window, the UE may only listen to the extended PO or additional PDCCH monitoring occasions when there is no PDCCH/DMRS transmission detected in the assigned PO. The UE may assume the presence of a signal, such as the demodulation reference signal (DMRS) in any PDCCH or GC-PDCCH transmission, to detect transmission bursts by the serving gNB, to enable power saving by allowing the UE to avoid performing blind decodes to detect the transmission burst.

In other embodiments, in order to reduce UE power consumption, the UE may only monitor the extended PO or additional PDCCH monitoring occasions where there is no PDCCH/DMRS transmission detected in the assigned PO. Once PDCCH/DMRS transmission is detected from the gNB in the PO, the UE may be able to stop monitoring the extended PO since the gNB manages to acquire the channel and is deemed able to schedule the paging for the UE if it intends to do so.

Figure 7:
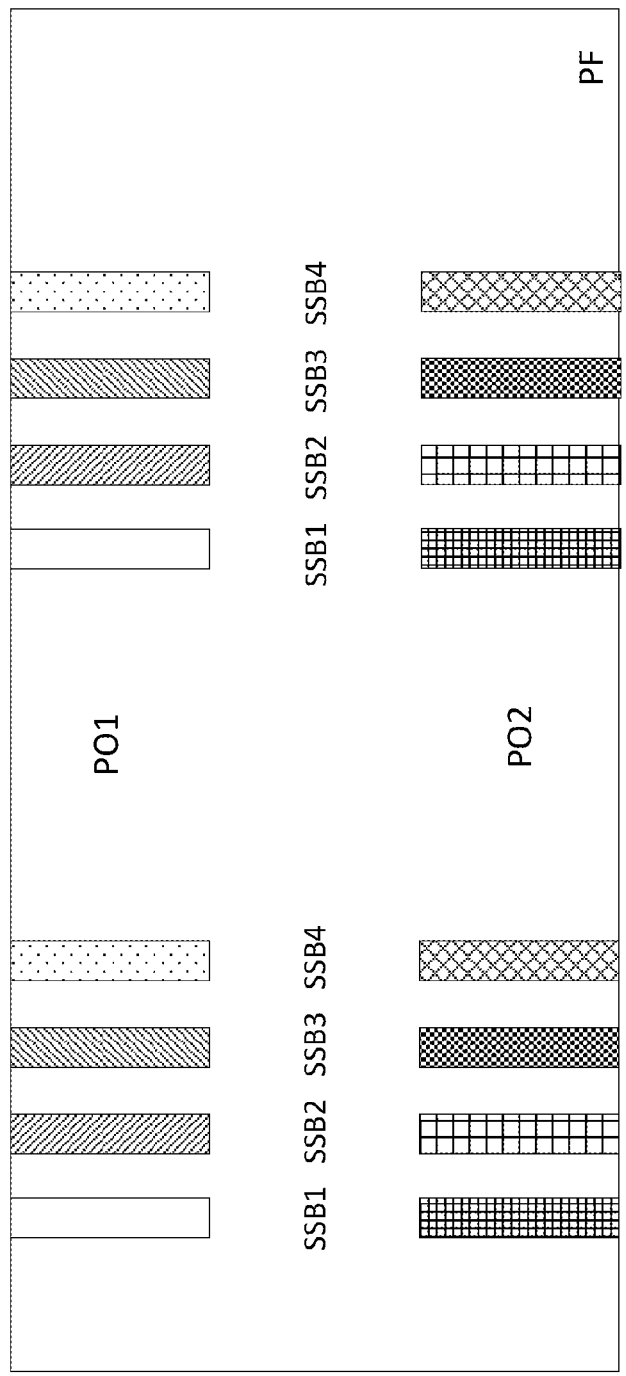
FIG. 7 illustrates an example of paging in accordance with some embodiments.

FIG. 7 illustrates an example of paging in accordance with some embodiments. FIG. 7, like FIG. 4, shows the number of PDCCH monitoring occasions in a PO being extended within the DRX cycle (i.e., extension of the paging occasion). As above, the network schedules the paging over 'x' PDCCH monitoring occasions, where 'x' is configurable via RRC signaling, for example. FIG. 7 again shows a paging frame with two POs where x=2 and the number of SSBs=4 (i.e. each PDCCH monitoring occasion corresponding to an SSB/beam is extended by 1) beam sweeps are repeated twice on PO1 for a set of UEs, and beam sweeps are repeated twice on PO2 for another set of UEs. Each SSB/PDCCH occasion may be transmitted on PO1 (each different SSB/PDCCH occasion is repeated once for x=2) for UE set 1 and PO2 (each different SSB/PDCCH occasion is repeated once for x=2) for UE set 2.

One benefit of the use of the deployment shown in FIG. 7 is that the paging formula may remain the same, the only addition being that a new variable 'x' may be used to indicate the repetition of the PDCCH monitoring occasions. More specifically, when SearchSpaceId=0 is configured for pagingSearchSpace, the PDCCH monitoring occasions for paging in the paging window may be the same as the PDCCH monitoring occasions for SIB1, where the mapping between PDCCH monitoring occasions and SSBs are defined in the RAN1 specification. However, PDCCH monitoring occasions may be extended beyond the original PDCCH monitoring occasions for the PO based on the new variable 'x'. When a SearchSpaceId other than 0 is configured for pagingSearchSpace, the $[x*N+K]^{th}$ PDCCH monitoring occasion(s) for paging in the paging window corresponds to the $K^{th}$ transmitted SSB, where x=0, 1, . . . X−1, K=1, 2, . . . N, N is the number of actual transmitted SSBs determined according to ssb-PositionsInBurst in SIB1 and X is equal to 'CEIL(number of PDCCH monitoring occasions in paging window/N). This is similar to the manner in which the PDCCH monitoring occasions are used for a system information (SI) message in SI window. The new variable 'x' may extend the number of PDCCH monitoring occasions by x times.

To prevent the consecutive sets of PDCCH monitoring occasions from overlapping, the network may ensure x*SSB(s) fit into a PO. This can be done by configuring the number of PFs (N) per DRX cycle and number of POs per PF (Ns) appropriately to provide the separation.

Figure 8:
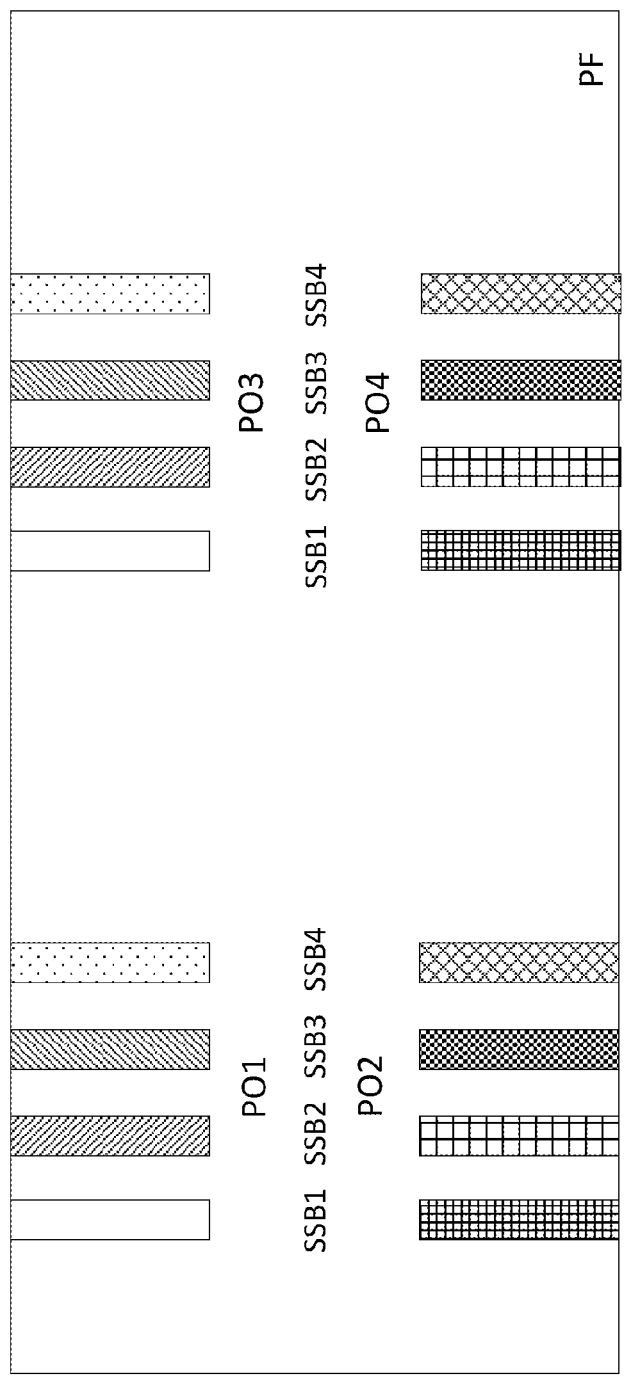
FIG. 8 illustrates an example of paging in accordance with some embodiments.

FIG. 8 illustrates an example of paging in accordance with some embodiments. As shown in FIG. 8, the UE may be associated with multiple non-consecutive POs. That is, as shown in FIG. 8, the beam sweeping may repeat on a different PO in a different PF.

In this case, the (SFN+PF_offset) mod T=(T div N)*(UE_ID mod N) may provide the UE with the starting position of the paging frame as before. However, the UE may be configured with additional POs in addition to the scheduled PO. With this approach, the UE may monitor not only the PDCCH monitoring occasions of the scheduled PO, but also the PDCCH monitoring occasions of the additional POs over each DRX cycle. Such additional POs can be configured via a bitmap for each UE paging group across the DRX cycle. Similar to the above embodiment, the network may ensure that the POs for different UE paging groups do not overlap.

Extra battery consumption is expected using the above embodiments due to the monitoring of additional monitoring occasions within each PO. However, the embodiment in FIG. 8 may introduce a delay for the UE to receive the page, depending on how far the extended PO(s) is from the scheduled PO. The network may buffer the page longer than usual. However, this embodiment might have a better chance of succeeding in LBT, since the two POs are spread out in time (depending on the channel load pattern).

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a next generation NodeB, the apparatus comprising:
   processing circuitry configured to:
      encode, for transmission to a user equipment (UE), discontinuous reception (DRX) information indicating a plurality of physical downlink control channel (PDCCH) monitoring occasions within a paging occasion of a paging frame;
      determine that downlink data is to be transmitted to the UE during a DRX cycle of the UE;
      apply listen-before-talk (LBT) to determine whether a PDCCH comprising a Paging Radio Network Temporary Identifier (P-RNTI) of the UE is able to be sent in an unlicensed band at a first of the plurality of PDCCH monitoring occasions within the paging occasion; and
      in response a determination that the PDCCH is unable to be sent due to LBT failure, apply LBT to determine whether the PDCCH is able to be sent in the unlicensed band at a second of the plurality of PDCCH monitoring occasions within the paging occasion, wherein respective PDCCH monitoring occasions of the plurality of PDCCH monitoring occasions within the paging occasion correspond to respective synchronization signal blocks (SSBs) of a plurality of SSBs from the next generation NodeB, wherein a first number of PDCCH monitoring occasions correspond to each SSB of the plurality of SSBs, and wherein the first number is greater than one and is configured via radio resource control (RRC) signaling; and a memory configured to store the paging information.

2. The apparatus of claim 1, wherein the processing circuitry is further configured to, in response to LBT failure, continue to apply LBT to determine whether the PDCCH is able to be sent in the unlicensed band at each of the plurality of PDCCH monitoring occasions within the paging occasion until the PDCCH is able to be sent at one of the PDCCH monitoring occasions or no further PDCCH monitoring occasions for the UE are available in the paging occasion.

3. The apparatus of claim 1, wherein the plurality of PDCCH monitoring occasions of the paging occasion is a set of PDCCH monitoring occasions selected from among different sets of PDCCH monitoring occasions of different paging occasions in the paging frame.

4. The apparatus of claim 3, wherein the different paging occasions are associated with different sets of UEs.

5. The apparatus of claim 3, wherein the plurality of PDCCH monitoring occasions occur over multiple subframes in a non-multibeam system.

6. The apparatus of claim 3, wherein the plurality of PDCCH monitoring occasions in each paging occasion are repeated in different beams within the paging frame in a multibeam system.

7. The apparatus of claim 6, wherein the plurality of PDCCH monitoring occasions are repeated in a time domain.

8. The apparatus of claim 6, wherein the plurality of PDCCH monitoring occasions are repeated in a frequency domain.

9. A method for operating a base station, the method comprising:
encoding, for transmission to a user equipment (UE), discontinuous reception (DRX) information indicating a plurality of physical downlink control channel (PDCCH) monitoring occasions within a paging occasion of a paging frame;
determining that downlink data is to be transmitted to the UE during a DRX cycle of the UE;
applying listen-before-talk (LBT) to determine whether a PDCCH comprising a Paging Radio Network Temporary Identifier (P-RNTI) of the UE is able to be sent in an unlicensed band at a first of the plurality of PDCCH monitoring occasions within the paging occasion;
in response a determination that the PDCCH is unable to be sent due to LBT failure, applying LBT to determine whether the PDCCH is able to be sent in the unlicensed band at a second of the plurality of PDCCH monitoring occasions within the paging occasion, wherein respective PDCCH monitoring occasions of the plurality of PDCCH monitoring occasions within the paging occasion correspond to respective synchronization signal blocks (SSBs) of a plurality of SSBs from the base station, wherein a first number of PDCCH monitoring occasions correspond to each SSB of the plurality of SSBs, and wherein the first number is greater than one and is configured via radio resource control (RRC) signaling; and
storing the paging information in a memory.

10. The method of claim 9, further comprising:
in response to LBT failure, continuing to apply LBT to determine whether the PDCCH is able to be sent in the unlicensed band at each of the plurality of PDCCH monitoring occasions within the paging occasion until the PDCCH is able to be sent at one of the PDCCH monitoring occasions or no further PDCCH monitoring occasions for the UE are available in the paging occasion.

11. The method of claim 9, wherein the plurality of PDCCH monitoring occasions of the paging occasion is a set of PDCCH monitoring occasions selected from among different sets of PDCCH monitoring occasions of different paging occasions in the paging frame.

12. The method of claim 11, wherein the different paging occasions are associated with different sets of UEs.

13. The method of claim 11, wherein the plurality of PDCCH monitoring occasions occur over multiple subframes in a non-multibeam system.

14. The method of claim 11, wherein the plurality of PDCCH monitoring occasions in each paging occasion are repeated in different beams within the paging frame in a multibeam system.

15. The method of claim 14, wherein the plurality of PDCCH monitoring occasions are repeated in a time domain.

16. The method of claim 14, wherein the plurality of PDCCH monitoring occasions are repeated in a frequency domain.

17. An apparatus of a user equipment (UE) device, the apparatus comprising:
processing circuitry configured to:
receive, from a base station, encoded discontinuous reception (DRX) information indicating a plurality of physical downlink control channel (PDCCH) monitoring occasions within a paging occasion of a paging frame;
receive, from the base station, a PDCCH in an unlicensed band at a first PDCCH monitoring occasion of the plurality of PDCCH monitoring occasions, wherein respective PDCCH monitoring occasions of the plurality of PDCCH monitoring occasions within the paging occasion correspond to respective synchronization signal blocks (SSBs) of a plurality of SSBs from the base station, wherein a first number of PDCCH monitoring occasions correspond to each SSB of the plurality of SSBs, and wherein the first number is greater than one and is configured via radio resource control (RRC) signaling; and
store the PDDCH in memory.

18. The apparatus of claim 17, wherein the plurality of PDCCH monitoring occasions of the paging occasion is a set of PDCCH monitoring occasions selected from among different sets of PDCCH monitoring occasions of different paging occasions in the paging frame.

19. The apparatus of claim 18, wherein the different paging occasions are associated with different sets of UEs.

20. The apparatus of claim 18, wherein the plurality of PDCCH monitoring occasions occur over multiple subframes in a non-multibeam system.

* * * * *